(12) United States Patent
Kitaji

(10) Patent No.: US 9,237,501 B2
(45) Date of Patent: Jan. 12, 2016

(54) RADIO COMMUNICATION SYSTEM, RADIO BASE STATION, RADIO RELAY STATION, AND HANDOVER CONTROL METHOD

(75) Inventor: Mitsuhiro Kitaji, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 851 days.

(21) Appl. No.: 13/395,073

(22) PCT Filed: Sep. 9, 2010

(86) PCT No.: PCT/JP2010/065559
§ 371 (c)(1),
(2), (4) Date: Mar. 8, 2012

(87) PCT Pub. No.: WO2011/030836
PCT Pub. Date: Mar. 17, 2011

(65) Prior Publication Data
US 2012/0202503 A1  Aug. 9, 2012

(30) Foreign Application Priority Data
Sep. 9, 2009  (JP) ................................. 2009-208423

(51) Int. Cl.
*H04W 36/00* (2009.01)
*H04W 36/22* (2009.01)
(Continued)

(52) U.S. Cl.
CPC ............... *H04W 36/22* (2013.01); *H04B 7/155* (2013.01); *H04W 84/047* (2013.01)

(58) Field of Classification Search
CPC ..... H04W 36/22; H04W 36/08; H04W 36/00; H04W 36/0022; H04W 36/0055; H04W 36/0066; H04W 48/16; H04W 84/005; H04W 84/045; H04W 88/04; H04B 7/2606; H04L 65/1083; H04L 1/1854; H04L 47/10; H04L 47/12

USPC .......................... 455/438, 436, 439, 442, 443
See application file for complete search history.

(56) References Cited

U.S. PATENT DOCUMENTS

2007/0086387 A1* 4/2007 Kang et al. .................... 370/331
2007/0249347 A1* 10/2007 Saifullah et al. .............. 455/436
(Continued)

FOREIGN PATENT DOCUMENTS

| CN | 101175304 A | 5/2008 |
|---|---|---|
| CN | 101287268 A | 10/2008 |

(Continued)

OTHER PUBLICATIONS

The English translation of the Office Action "Notice of Grounds for Rejection" issued by the Korean Patent Office on May 30, 2013, which corresponds to Korean Patent Application No. 10-2012-7006544 and is related to U.S. Appl. No. 13/395,073.
(Continued)

*Primary Examiner* — Nimesh Patel
(74) *Attorney, Agent, or Firm* — Studebaker & Brackett PC

(57) ABSTRACT

A radio communication system (1) is disclosed, in which a relay node (200) is connected to a radio base station (100A), radio terminals (300E-300G) are connected to the relay node (200), and the communication between each of the radio terminals (300E-300G) and the radio base station (100A) is relayed by the relay node (200). When the base station load, which is the load of the radio base station (100A), has exceeded a threshold value, the radio base station (100A) transmits, to the relay node (200), either the command of a relay handover in which the relay node (200) changes its connecting destination or the command of a terminal handover in which any one of the radio terminals (300E-300G) changes its connecting destination. The relay node (200) executes the relay handover in a case of receipt of the relay handover command from the radio base station (100A) or transfers the terminal handover command in a case of receipt of the terminal handover command from the radio base station (100A).

12 Claims, 9 Drawing Sheets

(51) Int. Cl.
*H04B 7/155* (2006.01)
*H04W 84/04* (2009.01)

(56) References Cited

U.S. PATENT DOCUMENTS

| | | | |
|---|---|---|---|
| 2007/0264933 A1 | 11/2007 | Kang et al. | |
| 2008/0081623 A1* | 4/2008 | Burgan et al. | 455/436 |
| 2008/0311961 A1* | 12/2008 | Cotevino et al. | 455/574 |
| 2009/0088164 A1* | 4/2009 | Shen et al. | 455/436 |
| 2010/0054155 A1 | 3/2010 | Cai et al. | |
| 2010/0173644 A1 | 7/2010 | Koyanagi | |
| 2013/0045674 A1 | 2/2013 | Koyanagi | |

FOREIGN PATENT DOCUMENTS

| | | |
|---|---|---|
| CN | 101384073 A | 3/2009 |
| JP | 2001-128208 A | 5/2001 |
| KR | 10-2007-0110766 A | 11/2007 |
| WO | 2009050794 A1 | 4/2009 |

OTHER PUBLICATIONS

3GPP TSG-RAN WG2 meeting #67; Mobile Relay Support Analysis; Shenzhen, China; Aug. 24-28, 2009.

3GPP TR 36.814 V0.4.1(Feb. 2009); 3rd Generation Partnership Project; Technical Specification Group Radio Access Network; Further Advancements for E-UTRA Physical Layer Aspects (Release 9).

International Search Report; PCT/JP2010/065559; Oct. 5, 2010.

The first Office Action issued by the Chinese Patent Office on Jan. 23, 2014, which corresponds to Chinese Patent Application No. 201080040265.4 and is related to U.S. Appl. No. 13/395,073; with English language concise explanation.

* cited by examiner

RADIO COMMUNICATION SYSTEM, RADIO BASE STATION, RADIO RELAY STATION, AND HANDOVER CONTROL METHOD

TECHNICAL FIELD

The present invention relates to a radio communication system, a radio base station, a radio relay station, and a handover control method in which relay transmission is applicable.

BACKGROUND ART

As the next-generation radio communication system for performing a higher speed communication as compared with the 3rd-generation and 3.5th-generation radio communication systems operated at present, LTE (Long Term Evolution) has been standardized in 3GPP (3rd Generation Partnership Project) which is the standardization body of a radio communication system.

The technical specifications of the LTE have been specified as 3GPP Release 8, and Release 9 which is an upgrade version of Release 8, and LTE Advanced which is a sophisticated version of the LTE, have been currently considered. In LTE Advanced, the adoption of relay transmission using a radio relay station called a relay node is planned (for example, see Non-Patent Document 1).

The radio relay station is a low-output relay base station connected to the radio base station (macro base station) via radio. The radio terminal connected to the radio relay station performs communication with the radio base station via the radio relay station. By installing a radio relay station in a cell end and a coverage hole of a radio base station such that a radio terminal communicates indirectly with the radio base station via the radio relay station, communication can be performed under better conditions as compared to when the radio terminal communicates directly with the radio base station.

PRIOR ART DOCUMENT

Non-Patent Document

Non-Patent Document 1: 3GPP TR 36.814 V0.4.1, Chapter 9 "Relaying functionality", February 2009

SUMMARY OF THE INVENTION

Because the radio relay station relays communications between the radio base station and the radio terminal, the throughput between the radio terminal and the radio base station depends on the throughput between the radio base station and the radio relay station. Therefore, when the load of the radio base station to which the radio relay station connects is high (for example, when the traffic handled by the radio base station is large), the throughput between the radio base station and the radio relay station declines, and the throughput between the radio terminal and the radio base station also declines.

Therefore, a problem that exists is that when the load of the radio base station to which the radio relay station connects is high, the throughput of the radio terminal that connects to the radio relay station declines even when the radio quality between the radio terminal and the radio relay station is excellent.

Thus, an object of the present invention is to provide a radio communication system, a radio base station, a radio relay station, and a handover control method, by which it is possible to improve the throughput of a radio terminal by planning appropriate load distribution.

A radio communication system according to the present invention is summarized as a radio communication system (e.g. radio communication system 1) comprising: a radio relay station (e.g. relay node 200) connected to a radio base station; and at least one radio terminal (e.g. radio terminals 300E to 300G) connected to the radio relay station such that the radio relay station relays the communication between the radio terminal and the radio base station, wherein when a base station load which is a load of the radio base station exceeds a first threshold value (e.g. threshold value 1), the radio base station transmits a command for either a relay station handover in which the radio relay station switches connection destinations, or a terminal handover in which the radio terminal switches the connection destinations to the radio relay station, and the radio relay station executes the relay station handover when the radio relay station receives the command for the relay station handover from the radio base station, and the radio relay station transmits the command for the terminal handover to the radio terminal when the radio relay station receives the command for the terminal handover from the radio base station.

In the radio communication system according to the present invention, the radio base station determines whether to execute the relay station handover or the terminal handover when the base station load exceeds the first threshold value, and the radio base station transmits the command for the relay station handover to the radio relay station when it is determined that the relay station handover is to be executed, and the radio base station transmits the command for the terminal handover to the radio relay station when it is determined that the terminal handover is to be executed.

In the radio communication system according to the present invention, the radio base station gives priority to the execution of the relay station handover over the terminal handover.

In the radio communication system according to the present invention, the radio base station receives from a relay station handover candidate, which is a candidate of a handover destination of the radio relay station, a load notification indicating the load of the relay station handover candidate, and the radio base station determines whether or not to execute the relay station handover based on the load notification received from the relay station handover candidate when the base station load exceeds the first threshold value.

In the radio communication system according to the present invention, the radio relay station transmits, to the radio base station, a first measurement result notification indicating a measurement result of the radio quality of a signal that the radio relay station receives, the radio base station determines the relay station handover candidate based on the first measurement result notification received from the radio relay station, and the radio base station transmits a load notification request requesting the transmission of the load notification to the determined relay station handover candidate.

In the radio communication system according to the present invention, the radio base station calculates the relay station load which is a load that the radio relay station and the radio terminal exert on the radio base station when the base station load exceeds the first threshold value, based on the load of the relay station handover candidate and the relay station load, the radio base station estimates the load of the relay station handover candidate when the radio relay station executes the relay station handover, and based on the estimated load of the relay station handover candidate, the radio base station determines whether or not to execute the relay station handover.

In the radio communication system according to the present invention, the radio base station receives from a terminal handover candidate, which is a candidate of a handover destination of the radio terminal, a load notification indicating the load of the terminal handover candidate, and upon determination that a terminal handover is to be executed in case that the base station load exceeds the first threshold value, the radio base station determines the radio terminal on which to execute the terminal handover, based on the load notification received from the terminal handover candidate.

In the radio communication system according to the present invention, the radio relay station transmits, to the radio base station, a second measurement result notification indicating a measurement result of the radio quality of a signal that the radio terminal receives, the radio base station determines the terminal handover candidate based on the second measurement result notification received from the radio relay station, and the radio base station transmits a load notification request requesting the transmission of the load notification to the determined terminal handover candidate.

In the radio communication system according to the present invention, when the base station load exceeds the first threshold value, the radio relay station calculates a terminal load which is a load that the radio terminal exerts on the radio relay station, and transmits a load notification indicating the terminal load to the radio base station, based on the load of the terminal handover candidate and the load notification received from the radio relay station, the radio base station estimates the load of the terminal handover candidate when the radio terminal executes the terminal handover and the base station load when the radio terminal executes the terminal handover, and based on the estimated load of the terminal handover candidate and the estimated load of the base station load, the radio base station determines the radio terminal on which to execute the terminal handover.

In the radio communication system according to the present invention, the radio relay station transmits a battery notification indicating the battery remaining amount of the radio terminal to the radio base station, and upon determination that a terminal handover is to be executed in case the base station load exceeds the first threshold value, the radio base station determines the radio terminal on which the terminal handover is to be executed based on the battery notification received from the radio relay station.

In the radio communication system according to the present invention, when the relay station handover or the terminal handover is executed as a result of the base station load exceeding the first threshold value, the radio base station transmits a notification concerning the relay station handover or the terminal handover to the radio relay station or the handover destination of the radio terminal.

In the radio communication system according to the present invention, after the relay station handover or the terminal handover is executed as a result of the base station load exceeding the first threshold value, when the base station load becomes smaller than a second threshold value (e.g. threshold value 2), the radio base station transmits a notification concerning the base station load to the radio relay station or the handover destination of the radio terminal.

In the radio communication system according to the present invention, when the relay station handover or the terminal handover is executed as a result of the base station load exceeding the first threshold value, the radio base station receives a notification concerning the load of the handover destination from the radio relay station or the handover destination of the radio terminal.

A radio base station according to the present invention is summarized as a radio base station (e.g. radio base station 100A) to which a radio relay station (e.g. relay node 200) that relays the communication with at least one radio terminal (e.g. radio terminals 300E to 300G) connects, comprising: a calculator (e.g. load calculator 131) configured to calculate a base station load which is a load of the radio base station; and a transmitter (e.g. transceiver unit 120) configured to transmit a command for either a relay station handover in which the radio relay station switches connection destinations, or a terminal handover in which the radio terminal switches the connection destinations to the radio relay station when the base station load exceeds a first threshold value.

A radio relay station according to the present invention is summarized as a radio relay station (e.g. relay node 200) that relays the communication between at least one radio terminal (e.g. radio terminals 300E to 300G) and a radio base station (e.g. radio base station 100A), comprising: a receiver (e.g. transceiver unit 230) configured to receive a command for either a relay station handover in which the radio relay station switches the connection destinations, or a terminal handover in which the radio terminal switches connection destinations from the radio base station; a handover execution unit (e.g. handover execution unit 253) configured to execute the relay station handover when the receiver receives the command for the relay station handover; and a transmitter (e.g. transceiver unit 240) configured to transmit the command for the terminal handover to the radio terminal when the receiver receives the command for the terminal handover.

A handover control method according to the present invention is summarized as a handover control method, comprising: a step of connecting, by a radio relay station, to a radio base station; a step of connecting, by at least one radio terminal, to the radio relay station; a step of relaying, by the radio relay station, the communication between the radio terminal and the radio base station; a step (e.g. step S610) of transmitting, from the radio base station to the radio relay station, a command for either a relay station handover in which the radio relay station switches connection destinations, or a terminal handover in which the radio terminal switches the connection destinations when a base station load which is a load of the radio base station exceeds a first threshold value; a step (e.g. step S670) of executing, by the radio relay station, the relay station handover when the radio relay station receives the command for the relay station handover from the radio base station; and a step (e.g. step S640) of transmitting, from the radio relay station to the radio terminal, the command for the terminal handover when the radio relay station receives the command for the terminal handover from the radio base station.

According to the present invention, it is possible to provide a radio communication system, a radio base station, a radio relay station, and a handover control method, by which it is possible to improve the throughput of a radio terminal by planning appropriate load distribution.

DESCRIPTION OF THE EMBODIMENTS

Figure 1:
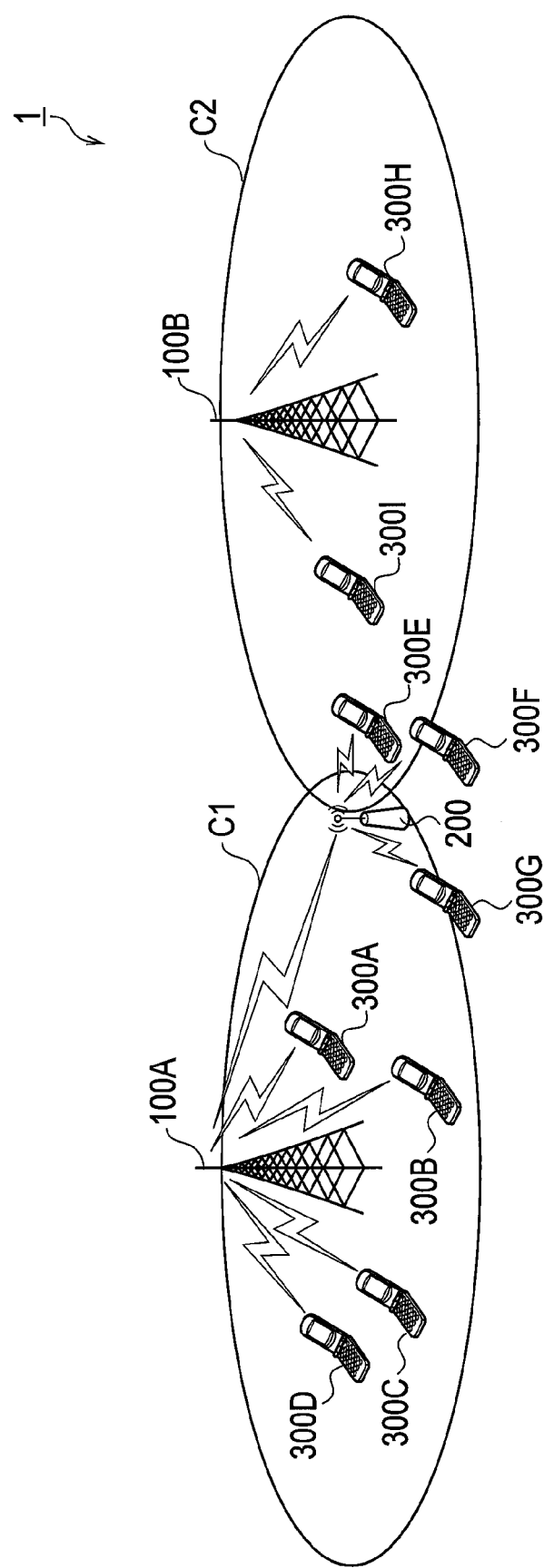
FIG. 1 is a diagram showing the configuration of a radio communication system according to an embodiment of the present invention.

A radio communication system according to an embodiment of the present invention is explained. Specifically, (1) Configuration of radio communication system, (2) Operation of radio communication system, (3) Modification of embodiment, and (4) Other embodiments are explained.

In all drawings for explaining the following embodiments, the same or similar reference numerals are used to designate the same or similar elements.

(1) Configuration of Radio Communication System

First of all, the configuration of radio communication system according to the present embodiment is explained in the order of (1.1) Entire configuration of radio communication system and (1.2) Detailed configuration of radio communication system.

(1.1) Entire Configuration of Radio Communication System

FIG. 1 is a diagram showing the configuration of a radio communication system 1 according to an embodiment. The radio communication system 1, for example, has a configuration based on LTE-Advanced which is positioned as a 4th-generation cellular phone system.

The radio communication system 1 has a radio base station 100A which forms a cell C1, and a radio base station 100B which forms a cell C2. The cell C1 is a communication area that can be connected to the radio base station 100A, and the cell C2 is a communication area that can be connected to the radio base station 100B. The radio base stations 100A and 100B are, for example, macro base stations forming the cells C1 and C2, respectively, having a radius of approximately a few hundred m.

The cells C1 and C2 are adjacent to each other with an overlapping portion, and hereinafter, the radio base station 100B is appropriately called a "neighbor base station of the radio base station 100A". Note that two radio base stations have been illustrated in FIG. 1, however, other radio base stations can be further installed adjacent to the two radio base stations.

The radio base station 100A and the radio base station 100B are connected via a backhaul network (not shown), which is a wired communication network, and communication between the base stations can be performed directly. In LTE, such an interface for communication between base stations is called an X2 interface.

Radio terminals 300A through 300D and a relay node 200 are connected to the radio base station 100A via radio. The radio terminals 300A through 300D communicate directly with the radio base station 100A. The radio terminals of the present embodiment are configured such that they can be moved. The relay node 200 is an end portion of the cell C1, and is installed in the proximity of the cell C2.

The radio terminals 300E through 300G are connected to the relay node 200 via radio. The relay node 200 is a radio relay station that relays communications between the radio terminals 300E through 300G and the radio base station 100A.

The radio terminals 300E through 300G indirectly perform communication with the radio base station 100A via the relay node 200. As a result of such a relay transmission, the radio terminals 300E through 300G can perform communication with the radio base station 100A even outside the cell C1. Hereinafter, the radio terminals 300E through 300G that connect to the relay node 200 are appropriately called "radio terminals served by the relay node 200".

The radio terminals 300H and 300I are connected to the radio base station 100B via radio. The radio terminals 300H and 300I communicate directly with the radio base station 100B. Hereinafter, if the radio base stations 100A and 100B are not differentiated, they are simply called the "radio base station 100", and if the radio terminals 300A through 300I are not differentiated, they are simply called the "radio terminal 300".

The radio base station 100A periodically calculates a base station load, which is a load of the radio base station 100A. In the present embodiment, a load, for example, refers to the amount of consumption of the radio resource (resource block) stipulated based on the frequency and time, or the amount of data that must be transmitted and received (traffic amount). However, the extent of interference received from an interference source may be included in the load. The base station load is the overall load of the radio base station 100A regardless of whether it is an uplink load or a downlink load.

The radio base station 100A determines whether to execute a relay handover or a terminal handover when the base station load exceeds a first threshold value. The case when the base station load exceeds the first threshold value implies the condition that the load of the radio base station 100A is increasing and it is difficult for the radio base station 100A to provide good communication.

Figure 2:
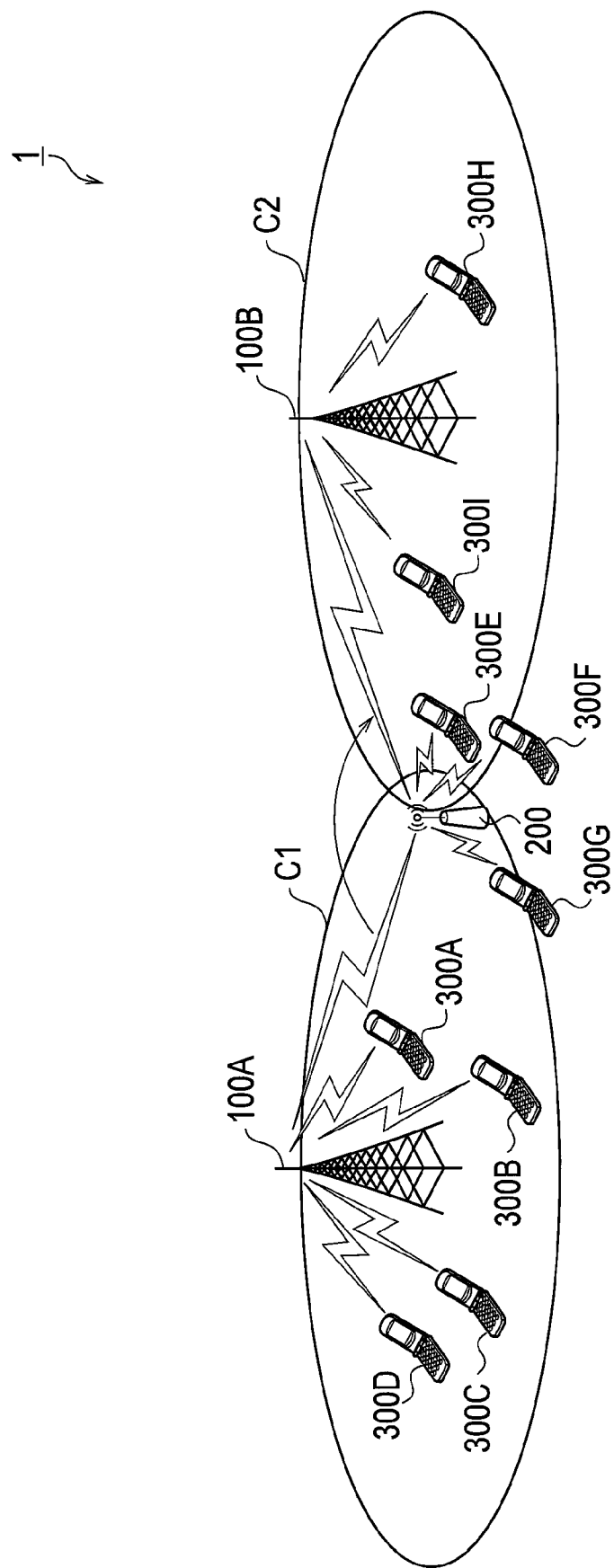
FIG. 2 is a diagram for explaining the handover of a relay node according to the embodiment of the present invention.

As shown in FIG. 2, a relay handover (relay station handover) is a handover in which the relay node 200 switches connection destinations. FIG. 2 illustrates a case in which the relay node 200 performs a handover from the radio base station 100A to the radio base station 100B.

Figure 3:
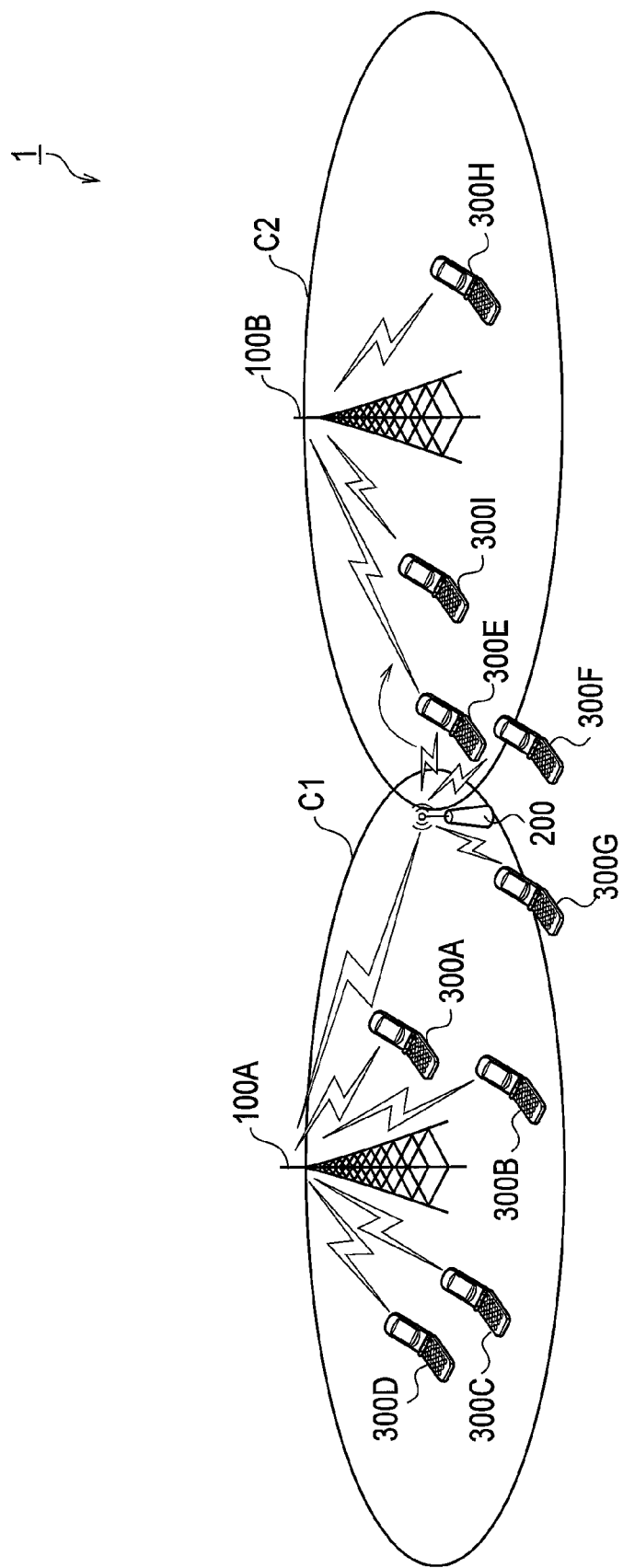
FIG. 3 is a diagram for explaining the handover of a radio terminal served by a relay node according to the embodiment of the present invention.

As shown in FIG. 3, a terminal handover is a handover in which a radio terminal (particularly, the radio terminal served by the relay node 200) switches the connection destinations. FIG. 3 illustrates a case in which the radio terminal 300E performs a handover from the radio base station 100A to the radio base station 100B.

Upon determination that a relay handover is to be executed, the radio base station 100A transmits a command for a relay handover to the relay node 200. Furthermore, when the radio base station 100A determines that a terminal handover is to be executed, the radio base station 100A transmits a command for a terminal handover to the relay node 200. The command for a handover (hereinafter, appropriately called a "handover command") contains information specifying the node to be handed over (the radio terminal or the relay node) and handover-destination information specifying the handover destination.

Thus, the radio base station 100A has the determination right of a handover concerning the radio terminals 300A through 300D that connect to the radio base station 100A and the relay node 200, and the determination right of a handover concerning a radio terminal served by the relay node 200.

By performing the processes concerning handover and calculations primarily in the radio base station 100A, an increase in traffic in the radio zone between the relay node 200 and the radio base station 100A can be avoided. Note that the radio base station 100B has the determination right of a handover concerning the radio terminals 300H and 300I that connect to the radio base station 100B.

The relay node 200 executes a handover when the relay node 200 receives a command for a relay handover from the radio base station 100A. Specifically, the relay node 200 executes a handover to the handover destination corresponding to the handover-destination information included in the handover command.

Upon receipt of a command for a terminal handover from the radio base station 100A, the relay node 200 transmits a command for terminal handover to a radio terminal served by the relay node 200. Specifically, the relay node 200 transmits a handover command to the radio terminal corresponding to the handover-destination information included in the handover command. The radio terminal that receives the handover command from the relay node 200 executes a handover to the handover destination corresponding to the handover-destination information included in the received handover command.

As shown in FIG. 2, in the radio communication system 1, when the base station load exceeds the first threshold value (that is, when the load of the radio base station 100A is high), the connection destination of the relay node 200 is switched from the radio base station 100A to the radio base station 100B by performing a relay handover in the relay node 200. Thus, the throughput of the radio terminals 300E to 300G which are served by the relay node 200 can be improved. Because the load of the radio base station 100A exerted by each of the radio terminals 300E through 300G which are served by the relay node 200 is cancelled, the base station load is reduced remarkably, and therefore, the throughput of the radio terminals 300A through 300D which communicate directly with the radio base station 100A can be improved.

As shown in FIG. 3, in the radio communication system 1, when the base station load exceeds the first threshold value (that is, when the load of the radio base station 100A is high), the throughput of the radio terminal 300E can be improved by performing a handover in the radio terminal 300E which is served by the relay node 200. Furthermore, due to the handover of the radio terminal 300E, the radio base station 100A is released from the load exerted by the radio terminal 300E, and the base station load is reduced.

A relay handover has a better effect of reducing the base station load than a terminal handover. Furthermore, it is a precondition that the relay node 200 is installed in a cell terminal and a coverage hole, and the relay node 200 has a higher-level radio communication function than the radio terminals, and therefore, a probability of achieving excellent communication even after a handover is high.

Therefore, in the present embodiment, the radio base station 100A gives priority to the execution of handover of the relay node 200 over the handover of the radio terminals served by the relay node 200. Furthermore, the radio base station 100A gives priority to the execution of handover of the relay node 200 over the handover of the radio terminals 300A through 300D which connect to the relay node 200.

On the other hand, a relay handover results in a rapid increase in the load at the handover destination. In the example shown in FIG. 2, the load of the radio base station 100B increases rapidly due to the relay handover. Therefore, under a situation such as when the load of the radio base station 100B is high, the radio base station 100A executes a terminal handover of each radio terminal served by the relay node 200 instead of a relay handover to the radio base station 100B. When executing a terminal handover, the radio base station 100A hands over at least one radio terminal from among the radio terminals served by the relay node 200 such that the base station load of the radio base station 100A becomes equal to or less than a predetermined value.

For example, the radio base station 100A receives a load notification indicating the load of the relay handover candidates from a relay handover candidate (radio base station 100B in the example shown in FIG. 2), which is a candidate of the handover destination of the relay node 200, through communication between the base stations. Based on the load notification received from the relay handover candidate, the radio base station 100A determines whether to execute a relay handover or a terminal handover.

When a relay handover is executed as a result of the base station load of the radio base station 100A exceeding the first threshold value, the radio base station 100A transmits a notification concerning the relay handover to the handover destination of the relay node 200. The notification concerning the relay handover is a notification for promoting the handover of the relay node 200 to the radio base station 100A, and for example, includes information for identifying the relay node 200 and information for identifying the radio base station 100A. This is because, from the viewpoint of radio quality, it is desirable for the relay node 200 positioned in the cell C1 to connect to the radio base station 100A or to be connected to the radio base station 100A.

Similarly, when the radio terminal is caused to execute a handover as a result of the base station load of the radio base station 100A exceeding the first threshold value, the radio base station 100A may transmit a notification concerning a terminal handover to the handover destination of the radio terminal. The notification concerning the terminal handover is a notification for promoting the handover of the radio terminal to the radio base station 100A, and for example, includes information for identifying the radio terminal and information for identifying the radio base station 100A.

Furthermore, when, after a relay handover is executed as a result of the base station load exceeding the first threshold value, a value obtained by adding the load obtained when the relay node 200 bounces back to the radio base station 100A to the base station load is smaller than the second threshold value, the radio base station 100A transmits a notification concerning the base station load of the radio base station 100A to the handover destination of the relay node 200. The second threshold value is lesser than the first threshold value or a value comparable with the first threshold value even when the relay node 200 returns to the radio base station 100A. The notification concerning the base station load of the radio base station 100A is a notification for promoting the handover of the relay node 200 to the radio base station 100A, and for example, includes information about the base station load of the radio base station 100A, or information that can identify this information. Alternatively, the information may be that which indicates that the value obtained by adding the load when the relay node 200 bounces back to the radio base station 100A to the base station load of the radio base station 100A is smaller than the threshold value 2. Similarly, when the radio terminal is caused to execute a terminal handover as a result of the base station load exceeding the first threshold value and then the base station load becomes smaller than the second threshold value, the radio base station 100A may transmit a notification concerning the base station load of the radio base station 100A to the handover destination of the radio terminal.

When the relay handover is executed as a result of the base station load of the radio base station 100A exceeding the first threshold value, the radio base station 100A receives a notification concerning the load of the handover destination from the handover destination of the relay node 200. The notification concerning the load of the handover destination of the relay node 200 includes information about the load of the handover destination of the relay node 200, or information that can identify this information. Similarly, when the radio terminal is caused to execute the terminal handover as a result of the base station load of the radio base station 100A exceeding the first threshold value, the radio base station 100A may receive a notification concerning the load of the handover destination of the radio terminal from the handover destination of the radio terminal.

(1.2) Detailed Configuration of Radio Communication System

Next, a detailed configuration of the radio communication system 1 is explained in the order of (1.2.1) Configuration of radio base station, (1.2.2) Configuration of relay node, and (1.2.3) Configuration of radio terminal.

(1.2.1) Configuration of Radio Base Station

Figure 4:
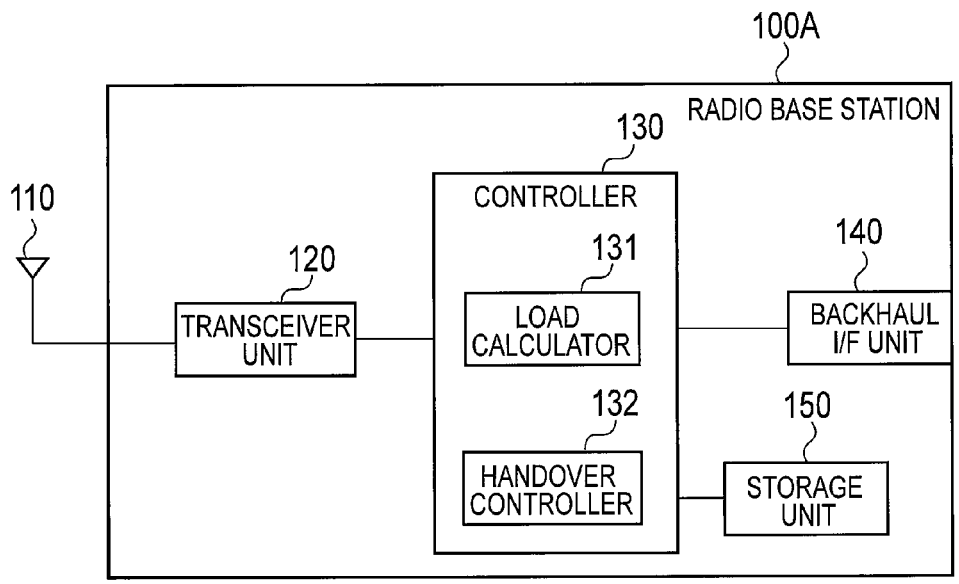
FIG. 4 is a block diagram showing the configuration of a radio base station according to the embodiment of the present invention.

FIG. 4 is a block diagram showing the configuration of the radio base station 100A. The radio base station 100B has a similar configuration as the radio base station 100A.

As shown in FIG. 4, the radio base station 100A has an antenna unit 110, a transceiver unit 120, a controller 130, a backhaul interface (I/F) unit 140, and a storage unit 150.

The transceiver unit 120 is, for example, configured by using a radio frequency (RF) circuit and a base band (BB) circuit, and transmits and receives radio signals via the antenna unit 110. Furthermore, the transceiver unit 120 encodes and modulates the transmission signal, and demodulates and decodes the reception signal.

The controller 130 is, for example, configured by using a CPU, and controls various functions of the radio base station 100A. The storage unit 150 is, for example, configured by using a memory, and stores various types of information used for controlling the radio base station 100A. The backhaul I/F unit 140 performs communication with another radio base station 100 via a backhaul network.

The controller 130 has a load calculator 131 and a handover controller 132. The load calculator 131 calculates the base station load of the radio base station 100A, and the load of another radio base station (for example, the radio base station 100B). The handover controller 132 controls the relay handover and terminal handover. Specifically, the handover controller 132 performs different types of processes concerning the handover, and generates messages concerning handover. The details of functions of the handover controller 132 are described later. Note that in the present embodiment, the transceiver unit 120 corresponds to the transmitter configured to transmit a command for either a relay handover or a terminal handover to the relay node 200.

(1.2.2) Configuration of Relay Node

Figure 5:
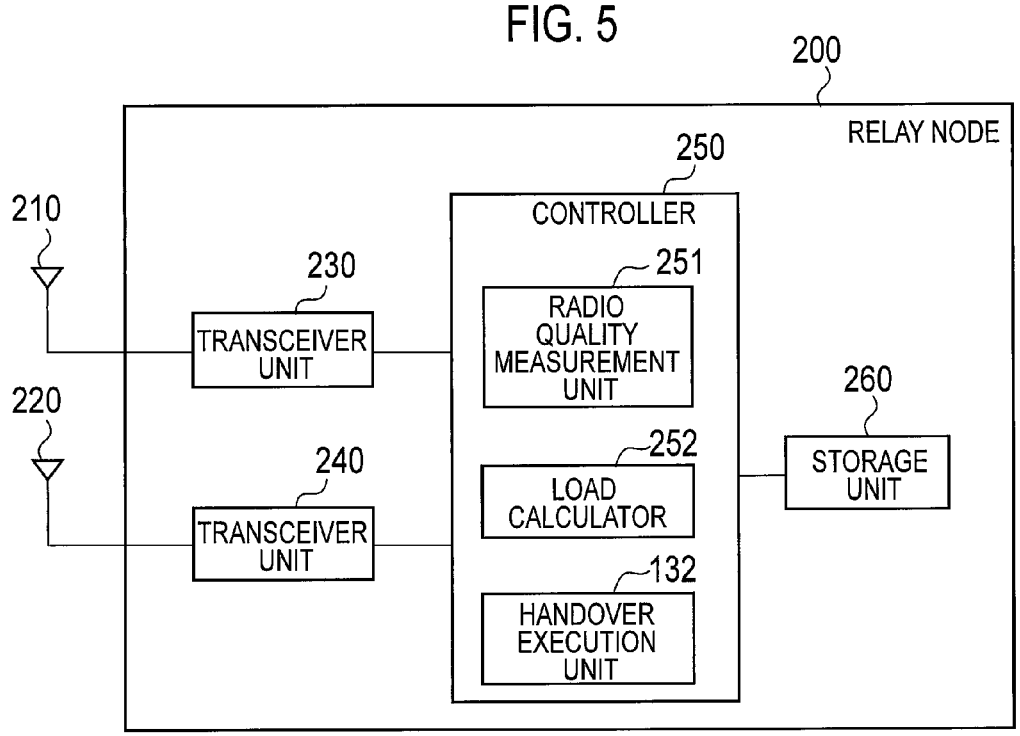
FIG. 5 is a block diagram showing the configuration of the relay node according to the embodiment of the present invention.

FIG. 5 is a block diagram showing the configuration of the relay node 200. As shown in FIG. 5, the relay node 200 has antenna units 210 and 220, transceiver units 230 and 240, a controller 250, and a storage unit 260.

The transceiver unit 230 is, for example, configured by using an RF circuit and a BB circuit, and transmits and receives radio signals to and from the radio base station 100. Furthermore, the transceiver unit 230 encodes and modulates the transmission signal, and demodulates and decodes the reception signal. In the present embodiment, the transceiver unit 230 corresponds to the receiver configured to receive a command for either a relay handover or a terminal handover from the radio base station 100.

The transceiver unit 240 is, for example, configured by using an RF circuit and a BB circuit, and transmits and receives radio signals to and from the radio terminal 300. Furthermore, the transceiver unit 240 encodes and modulates the transmission signal, and demodulates and decodes the reception signal. In the present embodiment, the transceiver unit 240 corresponds to a transmitter configured to transmit a command for a terminal handover to the radio terminal 300 when the transceiver unit 230 receives a command for terminal handover.

The controller 250 is, for example, configured by using a CPU, and controls various functions of the relay node 200. The storage unit 260 is, for example, configured by using a memory, and stores various types of information used for controlling the relay node 200.

The controller 250 has a radio quality measurement unit 251, a load calculator 252, and a handover execution unit 253.

The radio quality measurement unit 251 measures the radio quality of radio signals that the transceiver unit 230 receives. The received signal strength indicator (RSSI) of a reference signal transmitted periodically by each radio base station 100, or the carrier to interference and noise ratio (CINR) of the reference signal can be used as the radio quality of the radio signal.

The load calculator 252 calculates the terminal load, which is the load exerted by the radio terminals served by the relay node 200 on the relay node 200. The handover execution unit 253 executes a relay handover when the transceiver unit 230 receives a command for a relay handover.

(1.2.3) Configuration of Radio Terminal

Figure 6:
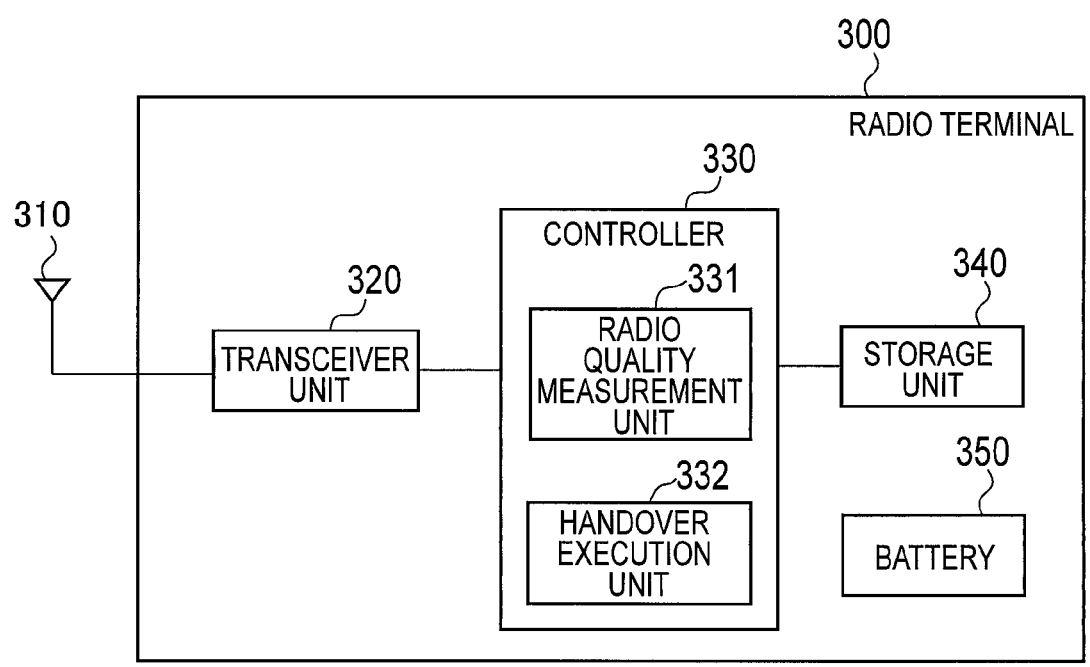
FIG. 6 is a block diagram showing the configuration of a radio terminal according to the embodiment of the present invention.

FIG. 6 is a block diagram showing the configuration of the radio terminal 300. As shown in FIG. 6, the radio terminal 300 has an antenna unit 310, a transceiver unit 320, a controller 330, a storage unit 340, and a battery 350.

The transceiver unit 320 is, for example, configured by using an RF circuit and a BB circuit, and transmits and receives radio signals to and from the radio base station or the relay node. Furthermore, the transceiver unit 320 encodes and modulates the transmission signal, and demodulates and decodes the reception signal. In the present embodiment, the transceiver unit 320 receives a command for a terminal handover from the relay node 200.

The controller 330 is, for example, configured by using a CPU, and controls various functions of the radio terminal 300. The storage unit 340 is, for example, configured by using a memory, and stores various types of information used for controlling the radio terminal 300.

The controller 330 has a radio quality measurement unit 331 and a handover execution unit 332.

The radio quality measurement unit 331 measures the radio quality of radio signals that the transceiver unit 320 receives. Here, the received signal strength indicator (RSSI) of a reference signal transmitted periodically by each radio base station or each relay node, or the CINR of the reference signal can be used as the radio quality of the radio signal.

The handover execution unit 332 executes a terminal handover when the transceiver unit 320 receives a command for a terminal handover.

The battery 350 is charged with an electric power supplied to each block of the radio terminal 300. The controller 330 is configured to be able to detect the remaining amount of electric power charged in the battery 350 (hereinafter, a battery remaining amount).

(2) Operation of Radio Communication System

Next, an operation of the radio communication system 1 is explained in the order of (2.1) Operation of entire radio communication system, (2.2) Handover-destination candidate determination process, and (2.3) Handover destination determination process.

(2.1) Operation of Entire Radio Communication System

Hereinafter, operation examples 1 and 2 of the entire radio communication system 1 are explained. In LTE, the radio base station controls the handover of the radio terminals in accordance with the measurement results of the radio quality of the signals received in the radio terminals. Even in the present embodiment, the radio terminals 300E through 300G and the relay node 200 must notify the measurement results of the radio quality to the radio base station.

The first operation example is an operation example in which the radio terminals 300E through 300G and the relay node 200 notify the measurement results of the radio quality when a specific event occurs. The second operation example is an operation example in which the radio terminals 300E through 300G and the relay node 200 periodically notify the measurement results of the radio quality.

(2.1.1) First Operation Example

Figure 7:
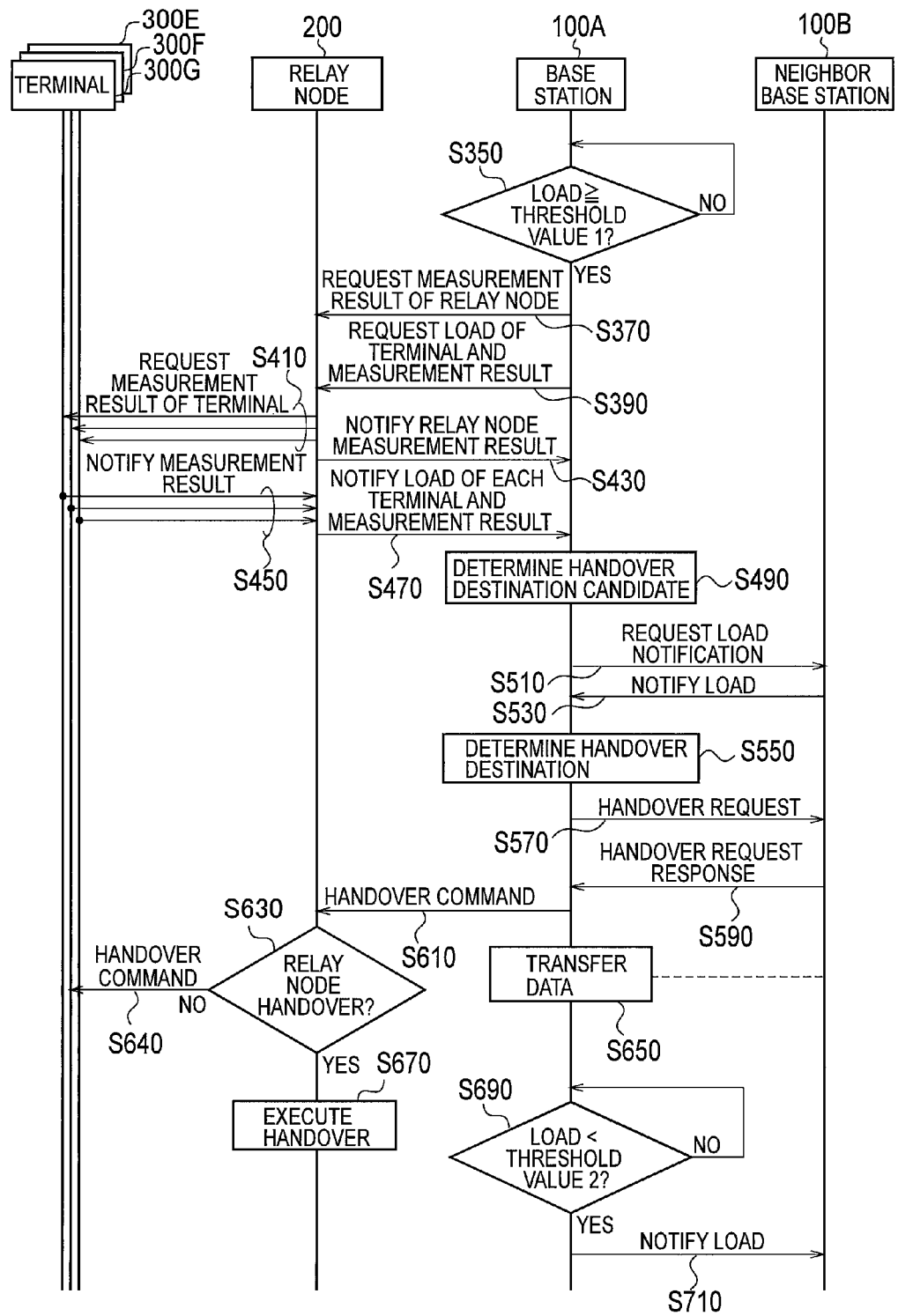
FIG. 7 is a sequence diagram showing a first operation example of the radio communication system according to the embodiment of the present invention.

FIG. 7 is a sequence diagram showing the first operation example of the radio communication system 1.

The load calculator 131 of the radio base station 100A calculates the base station load. In step S350, the handover controller 132 of the radio base station 100A compares the base station load calculated by the load calculator 131 with the threshold value 1. When the load of the radio base station 100A is equal to or more than the threshold value 1, the process proceeds further.

In step S370, the transceiver unit 120 of the radio base station 100A transmits a measurement result request requesting the notification of the measurement results of the radio quality in the relay node 200 to the relay node 200. The transceiver unit 230 of the relay node 200 receives the measurement result request.

The radio quality measurement unit 251 of the relay node 200 measures the radio quality of the radio signals that the transceiver unit 230 receives from the radio base station 100A and the neighbor base station (such as the radio base station 100B) of the radio base station 100A. The transceiver unit 230 of the relay node 200 transmits the measurement result notification indicating the measurement results by the radio quality measurement unit 251 to the radio base station 100A (step S430).

In step S390, the transceiver unit 120 of the radio base station 100A transmits the notification request of the measurement results of the radio quality in the radio terminals 300E through 300G served by the relay nodes 200, and the notification request of the terminal load to the relay node 200. The transceiver unit 230 of the relay node 200 receives the notification request. Upon receiving the notification request of terminal load, the load calculator 252 of the relay node 200 calculates the terminal load concerning each of the radio terminals 300E through 300G.

In step S410, the transceiver unit 240 of the relay node 200 transmits a measurement result request requesting the notification of the measurement results of the radio quality in the radio terminals 300E through 300G to the radio terminals 300E through 300G. The transceiver unit 320 of the radio terminals 300E through 300G receives the measurement result request.

Upon receiving the measurement result request, the radio quality measurement unit 331 of the radio terminals 300E through 300G measures the radio quality of the radio signal that the transceiver unit 320 receives from the relay node 200, the radio base station 100A, and the neighbor base station (such as the radio base station 100B). The transceiver unit 320 of the radio terminals 300E through 300G transmits the measurement result notification indicating the measurement results by the radio quality measurement unit 331 to the relay node 200 (step S450). The transceiver unit 240 of the relay node 200 receives the measurement result notification.

In step S470, the transceiver unit 230 of the relay node 200 transmits a load notification indicating each terminal load calculated by the load calculator 252, and a measurement result notification corresponding to the measurement result notification that the transceiver unit 240 receives from the radio terminals 300E through 300G to the radio base station 100A. The load notification and measurement result notification may be compiled as a single message or as individual messages. The transceiver unit 120 of the radio base station 100A receives the load notification and the measurement result notification.

In step S490, the handover controller 132 of the radio base station 100A determines the radio base station (hereinafter, the candidate base station) that acts as a candidate of the handover destination for the relay node 200 and each of the radio terminals 300E through 300G based on the measurement result notification that the transceiver unit 120 receives from the relay node 200. Here, the radio base station 100B is determined as a candidate base station. The details of step S490 are described later.

In step S510, the backhaul I/F unit 140 of the radio base station 100A transmits a load notification request requesting the notification of the load of the candidate base station (radio base station 100B) to the radio base station 100B. The backhaul I/F unit 140 of the radio base station 100B receives the load notification request.

In step S530, the load calculator 131 of the radio base station 100B calculates the load of the radio base station 100B, and transmits a load notification indicating the calculated load to the radio base station 100A. The backhaul I/F unit 140 of the radio base station 100A receives the load notification.

In step S550, the handover controller 132 of the radio base station 100A determines the node to be handed over (the radio terminal or the relay node), and the radio base station of the handover destination from the relay node 200 and the radio terminals 300E through 300G. Here, the radio base station 100B is determined as the radio base station of the handover destination. The details of step S550 are described later.

In step S570, the backhaul I/F unit 140 of the radio base station 100A transmits a request for a handover (handover request) to the radio base station of the handover destination (radio base station 100B), and receives a response indicating acceptance of a handover (handover request response) from the radio base station 100B.

In step S610, the transceiver unit 120 of the radio base station 100A transmits a handover command to the relay node 200. The transceiver unit 230 of the relay node 200 receives the handover command. Furthermore, the backhaul I/F unit 140 of the radio base station 100A transfers untransmitted data addressed to the node to be handed over to the radio base station of the handover destination (radio base station 100B) (step S650).

If the handover command that the transceiver unit 230 of the relay node 200 receives is a handover command for any of the radio terminals 300E through 300G served by the relay node 200 (step S630; NO), then in step S640, the transceiver unit 240 of the relay node 200 transmits a handover command to the corresponding radio terminal.

On the other hand, if the handover command that the transceiver unit 230 of the relay node 200 receives is a handover command for the relay node 200 (step S630; YES), then in step S670, the handover execution unit 253 of the relay node 200 performs a handover from the radio base station 100A to the radio base station 100B in accordance with the handover command.

The load calculator 131 of the radio base station 100A re-calculates the base station load. The base station load in such a case may be a value to which the load of the handed over node is added, or may be the current load of the radio base station 100A. In step S690, the handover controller 132 of the radio base station 100A compares the base station load re-calculated by the load calculator 131 with the threshold value 2. If the base station load is smaller than the threshold value 2, then in step S710, the backhaul I/F unit 140 of the radio base station 100A transmits a load notification concerning the base station load re-calculated by the load calculator 131 to the radio base station of the handover destination (radio base station 100B).

When the radio base station 100B receives a load notification from the radio base station 100A, for example, the radio base station 100B transmits a command to the node that has been handed over from the radio base station 100A for handover to the radio base station 100A.

Alternatively, when the radio base station 100B receives a load notification from the radio base station 100A, the radio base station 100B may return information indicating the current load of the node that has been handed over to the radio base station 100B. Such message transceiver is performed, and thus, the handed over node is handed over from the radio base station 100B to the radio base station 100A so that the original state may be restored. When the original state is the most appropriate state in terms of the radio quality, the most appropriate state desirably is restored by restoring to the original state at a time point at which the load of the radio base station 100A becomes smaller.

Furthermore, the radio base station of the handover destination (radio base station 100B) may periodically notify the information about the load of an own base station, or occasionally send a notification whenever there are changes, to the base station of the handover source (radio base station 100A). In this way, it is possible to prompt the base station of the handover source as to whether or not to return the handed over node to its source.

(2.1.2) Second Operation Example

Figure 8:
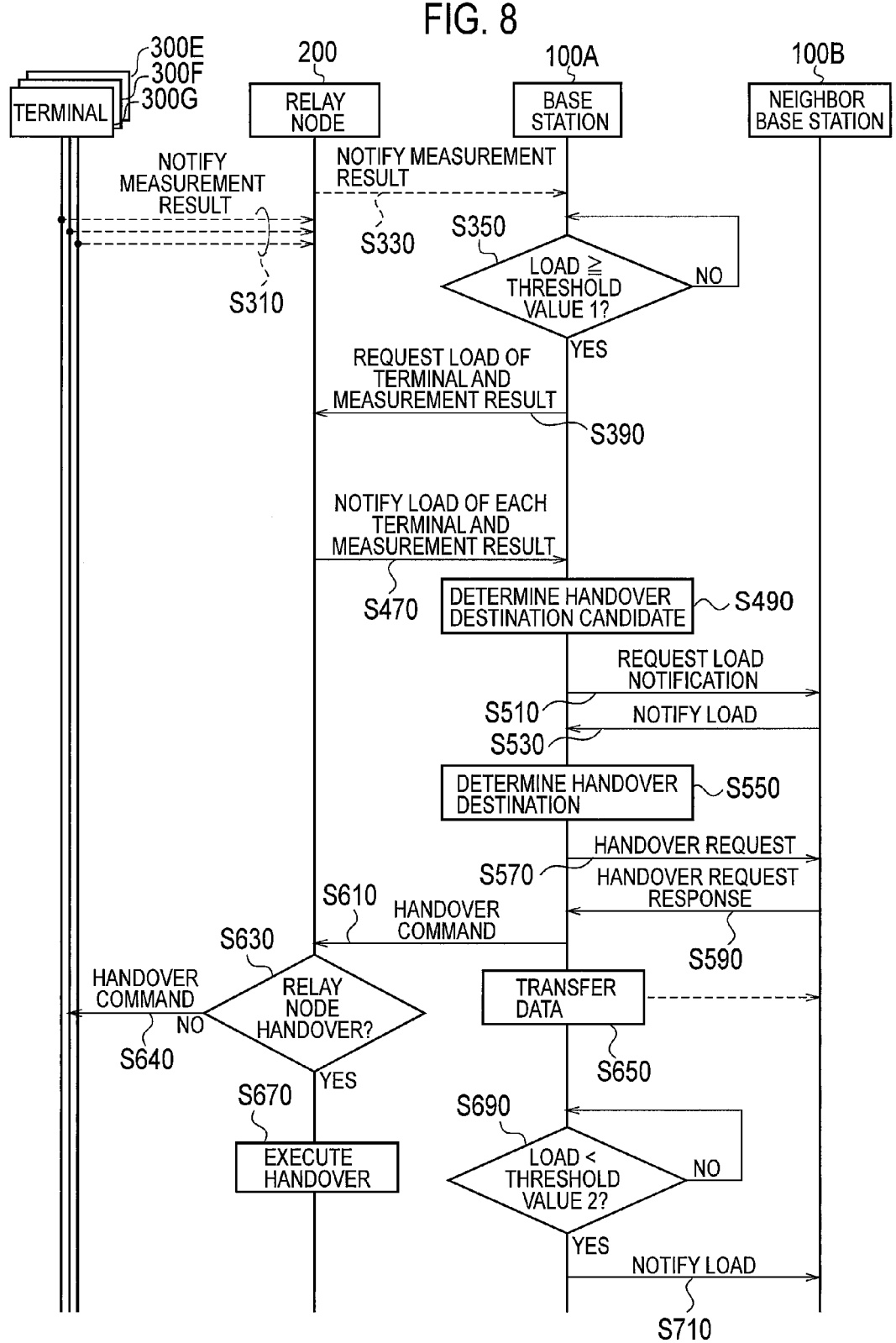
FIG. 8 is a sequence diagram showing a second operation example of the radio communication system according to the embodiment of the present invention.

FIG. 8 is a sequence diagram showing the second operation example of the radio communication system 1.

The radio terminals 300E through 300G served by the relay node 200 periodically transmit the radio quality, and periodically transmit the measurement result notification to the relay node 200 (step S310). Furthermore, the relay node 200 periodically measures the radio quality, and periodically transmits the measurement result notification to the radio base station 100A (step S330).

In the second operation example, because the relay node 200 acquires the radio quality in the radio terminals 300E through 300G served by the relay node 200 at all times, and the radio base station 100A acquires the radio quality in the relay node 200 at all times, the process such as step S370 explained in the first operation example is omitted.

(2.2) Handover-Destination Candidate Determination Process

Next, the handover-destination candidate determination process, that is, step S490 of FIG. 7 and FIG. 8 is explained.

The relay node 200 transmits a measurement result notification (a first measurement result notification) indicating the measurement results of the radio quality of a signal that the relay node 200 receives to the radio base station 100A (step S430 of FIG. 7 and step S330 of FIG. 8). In the handover-destination candidate determination process, the radio base station 100A determines a candidate of the handover destination of the relay node 200 based on the measurement result notification received from the relay node 200. Thus, the candidate of the handover destination of the relay node 200 can be determined appropriately, and excellent communication of the relay node 200 after a relay handover is possible.

The relay node 200 transmits a measurement result notification (a second measurement result notification) indicating the measurement results of the radio quality of a signal that a radio terminal receives to the radio base station 100A (step S470 of FIG. 7 and FIG. 8). The radio base station 100A determines a candidate of the handover destination of the radio terminal 300 based on the measurement result notification received from the relay node 200. Thus, the candidate of the handover destination of the radio terminal 300 can be determined appropriately, and excellent communication of the radio terminal 300 after a terminal handover is possible.

Figure 9:
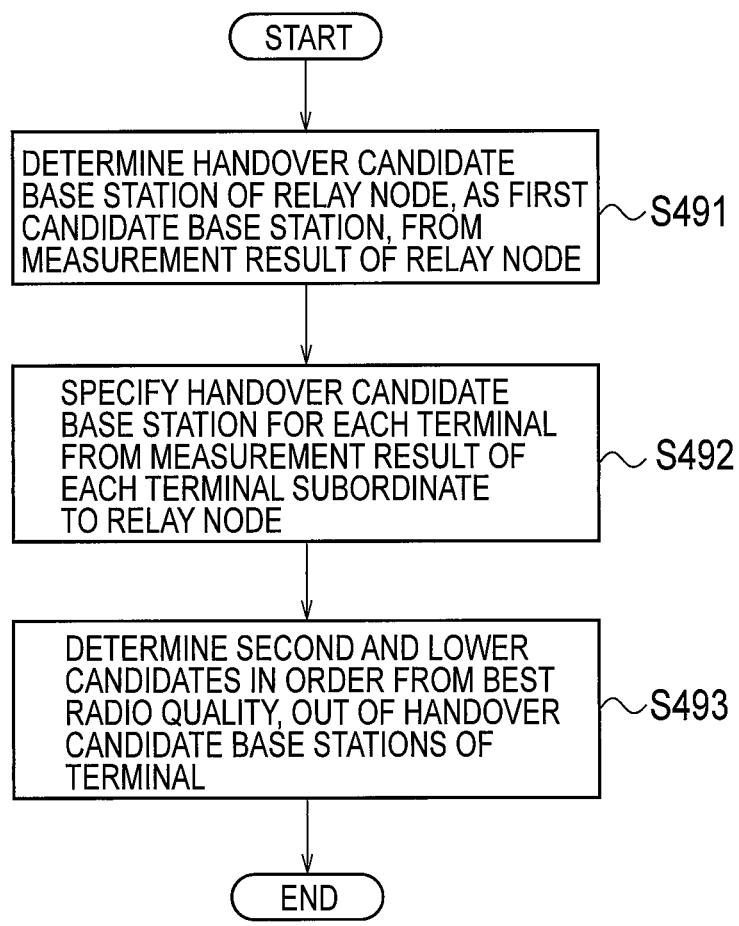
FIG. 9 is a flowchart showing the details of step S490 of FIG. 7 and FIG. 8.

FIG. 9 is a flowchart showing the details of step S490.

In step S491, from among the radio base stations other than the radio base station 100A to which the relay node 200 is currently connected, the handover controller 132 of the radio base station 100A determines the radio base station with the best radio quality as the first candidate base station of the handover destination (relay handover candidate) based on the measurement results of the radio quality of the relay node 200. If the radio quality of the radio base station other than the radio base station 100A to which the relay node 200 is currently connected cannot be measured, or even if it can be measured but is equal to or less than a predetermined quality, then a determination is made that there is no first candidate base station.

In step S492, the handover controller 132 of the radio base station 100A specifies and enumerates the handover candidate base station of each radio terminal (terminal handover candidate) from the measurement results of the radio quality of the radio terminals 300E through 300G served by the relay node 200. Specifically, each radio base station with the best radio quality in each radio terminal is considered as the handover candidate base station. If the radio quality of the radio base stations cannot be measured, or even if it can be measured but is equal to or less than a predetermined quality, then a determination is made that there is no handover candidate base station for the radio terminal.

In step S493, the handover controller 132 of the radio base station 100A assigns a priority order in the form of second candidate, third candidate, . . . , and Nth candidate in the order from the best radio quality for the handover candidate base stations enumerated in step S492. Based on the processes of step S491 through step S493, the first candidate base station through the Nth candidate base station are determined.

(2.3) Handover-Destination Determination Process

Next, the handover-destination determination process, that is, step S550 of FIG. 7 and FIG. 8 is explained.

When the base station load exceeds the first threshold value, the radio base station 100A calculates the relay station load which is the load that the relay node 200 and the radio terminals 300E through 300G exert on the radio base station 100A, then based on the load of the relay handover candidate and the relay station load, the radio base station 100A estimates the load of the relay handover candidate when the relay node 200 executes a relay handover, and then based on the estimated load of the relay handover candidate, the radio base station 100A determines whether or not to perform a relay handover. Thus, the load after a relay handover can be estimated beforehand, and it can be decided that a relay handover is to be executed if the load after the relay handover is within a permissible range, and a relay handover is not to be executed if the load after the relay handover is within a non-permissible range.

Furthermore, when it is determined that a relay handover is not to be executed, the radio base station 100A estimates the load of the terminal handover candidate when the radio terminal 300 performs a terminal handover, and the base station load when the radio terminals perform a terminal handover, based on the terminal load notified from the relay node 200 and the load of the terminal handover candidate. Thus, based on the estimated load of the terminal handover candidate, and the estimated load of the base station load, the radio base station 100A determines the radio terminal on which a terminal handover is to be executed. Thus, by previously estimating the load of the own base station after the terminal handover and the load of the handover destination, the radio terminal to be handed over can be determined such that each of the loads can be balanced optimally.

Figure 10:
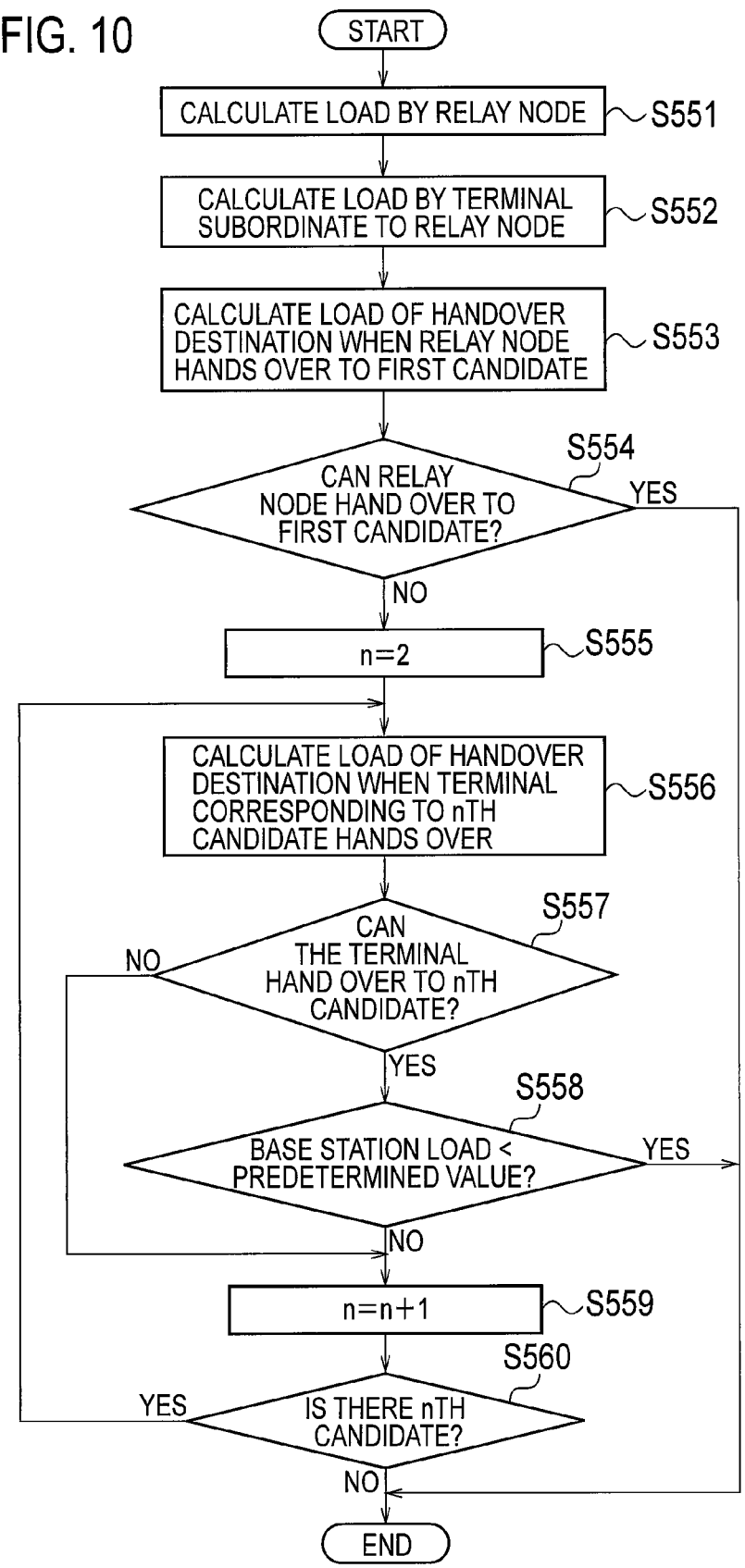
FIG. 10 is a flowchart showing the details of step S550 of FIG. 7 and FIG. 8.

FIG. 10 is a flowchart showing the details of step S550.

In step S551, the load calculator 131 of the radio base station 100A calculates the load exerted by the relay node 200 (hereinafter, a relay node load). The relay node load is the load of the entire target relay node 200 including the radio terminals 300E through 300G served by the relay node 200.

In step S552, the load calculator 131 of the radio base station 100A calculates the load exerted by the radio terminals 300E through 300G served by the relay node 200 (hereinafter, a terminal load) from the load notification received from the relay node 200 in step S470. The terminal load is a load of each radio terminal 300E through 300G served by the relay node 200 within the load of the radio base station 100A.

In step S553, the load calculator 131 of the radio base station 100A calculates the load of the first candidate base station when the relay node 200 executes a handover to the first candidate base station, based on the load of the first candidate base station corresponding to the load notification received in step S530 and the load of the relay node 200 (relay node load) calculated in step S551.

In step S554, the handover controller 132 of the radio base station 100A determines whether or not the relay node 200 can be handed over to the first candidate base station, based on the load of the handover destination calculated in step S553. For example, the handover controller 132 determines that a handover is possible when the load of the first candidate base station calculated in step S553 is equal to or less a predetermined value, and a handover is not possible in other cases.

When it is determined that the handover to the first candidate base station is possible, the handover controller 132 determines the first candidate base station as the handover destination of the relay node 200. When it is determined that the handover to the first candidate base station is not possible, the handover controller 132 abandons the handover of the relay node 200, and then in step S555 and thereafter, the handover controller 132 determines the handover of each radio terminal.

In step S555, the load calculator 131 of the radio base station 100A determines n, which shows the candidate base station, as 2.

In step S556, the load calculator 131 calculates the load of the nth candidate base station (here, the second candidate base station) when the radio terminal corresponding to the nth candidate base station is handed over to the nth candidate base station, based on the terminal load of the radio terminal corresponding to the nth candidate base station, and the load of the nth candidate base station corresponding to the load notification received in step S530.

In step S557, the handover controller 132 of the radio base station 100A determines whether or not the radio terminal corresponding to the nth candidate base station can be handed over to the nth candidate base station, based on the load of the nth candidate base station calculated in step S556. For example, the handover controller 132 determines that a handover is possible when the load of the nth candidate base station calculated in step S556 is equal to or less than a predetermined value, and the handover is not possible in other cases.

When it is determined that a handover to the nth candidate base station is possible, the handover controller 132 determines the nth candidate base station as the handover destination of the radio terminal. Thus, in step S558, the handover controller 132 determines whether or not the base station load of the radio base station 100A is equal to or less than a predetermined value due to the handover of the radio terminal to the handover destination (nth candidate base station). When the base station load is equal to or less than the predetermined value, the handover controller 132 determines the radio terminal as the node to be handed over, and determines the nth candidate base station as the handover destination, and ends the process.

On the other hand, if it is determined that handover to the nth candidate base station is not possible, the handover controller 132 determines n=n+1 in step S559, and proceeds to a judgment process of the next candidate base station.

In step S560, the handover controller 132 determines whether or not the process is complete for all candidate base stations and if a candidate base station for which the process is not complete exists, the process returns to step S556. If the process is complete for all candidate base stations (step S560; NO), then if the handover destination has been determined in the process up to then, the handover controller 132 determines the radio terminal corresponding to the determined handover destination as the node to be handed over. If the process is complete for all candidate base stations (step S560; NO), then if the handover destination has not been determined in the process up to then, the process is ended regarding that there is no handover destination.

If the process is ended when step S558 is YES, the load of the radio base station 100A is equal to or less than the predetermined value, but if the process is ended when step S560 is NO, the load of the radio base station 100A is not equal to or less than the predetermined value. At this point, the handover controller 132 of the radio base station 100A may perform a similar process for the relay nodes other than the relay node 200 such that the load of the radio base station 100A becomes equal to or less than the predetermined value, or may reduce the load of the radio base station 100A by handing over the radio terminals 300A through 300D that connect to the radio base station 100A.

Furthermore, if it is possible to hand over the radio terminals 300E through 300G served by the relay node 200 to the radio base station 100A, and if it is possible to hand over the relay node 200 to another radio base station when the load of the relay node 200 has been reduced, then these operations may be performed.

(3) Modification of the Embodiment

In the present embodiment, the radio terminal 300 to be handed over is determined in view of the battery remaining amount of the radio terminal 300.

The radio terminal 300 transmits a battery notification indicating the battery remaining amount of an own terminal to the relay node 200. The relay node 200 transmits the battery notification to the radio base station 100A. For example, the relay node 200 may further transmit the battery notification to the radio base station 100A in step S470 of FIG. 7.

When the handover controller 132 of the radio base station 100A determines that a terminal handover is to be executed in case the base station load of the radio base station 100A exceeds the first threshold value, the handover controller 132 determines the radio terminal on which the terminal handover is to be executed based on the battery notification received from the relay node 200.

For example, the handover controller 132 may prioritize the candidate base stations of handover based on the battery remaining amount in step S493 of FIG. 9. The connection of the radio terminal 300 having a low battery remaining amount to the relay node 200 which is closer than the radio base station 100A results in low transmission power leading to battery saving of the radio terminal 300 which has a low battery remaining amount.

(4) Other Embodiments

As described above, the present invention has been described with the embodiments. However, it should not be understood that those descriptions and drawings constituting apart of the present disclosure limit the present invention. From the present disclosure, various alternative embodiments, embodiments, and operational technologies will become apparent to those skilled in the art.

For example, in the above embodiment, the relay node 200 is of fixed type, but it may be configured such that it is movable.

In the aforementioned embodiment, the radio base station 100A determines the candidate of the handover destination in accordance with the measurement result notification. However, when the relay node 200 is of fixed type, the candidate of the handover destination may be determined beforehand.

In the aforementioned embodiment, a case in which a radio terminal served by the relay node 200 is handed over from the relay node 200 to the radio base station is explained; however, the handover destination of the radio terminal served by the relay node 200 is not limited to the radio base station, and may be a relay node. Furthermore, a case in which the relay node 200 is handed over between radio base stations is explained; however, the handover destination of the relay node 200 is not limited to a radio base station, and may be a relay node.

Thus, it must be understood that the present invention includes various embodiments that are not described herein. Therefore, the present invention is limited only by the specific features of the invention in the scope of the claims reasonably evident from the disclosure above.

Note that the entire contents of Japanese Patent Application No. 2009-208423 (filed on Sep. 9, 2009) are incorporated in the present specification by reference.

INDUSTRIAL APPLICABILITY

Thus, the radio communication system, the radio base station, the radio relay station, and the handover control method according to the present invention can improve the throughput of a radio terminal through appropriate load distribution, and therefore, the present invention is useful in radio communications such as mobile communication.

The invention claimed is:

1. A radio communication system comprising: a radio relay station connected to a radio base station; and at least one radio terminal connected to the radio relay station such that the radio relay station relays the communication between the radio terminal and the radio base station, wherein
the radio base station receives from a relay station handover candidate, which is a candidate of a handover destination of the radio relay station, a load notification indicating the load of the relay station handover candidate, wherein the radio relay station transmits a battery notification indicating the battery remaining amount of the radio terminal to the radio base station, and
upon determination that a terminal handover is to be executed in case the base station load exceeds the first threshold value, the radio base station determines the radio terminal on which the terminal handover is to be executed based on the battery notification received from the radio relay station;
when a base station load which is a load of the radio base station exceeds a first threshold value, the radio base station determines whether to execute the relay station handover or the terminal handover, wherein the radio base station determines whether or not to execute the relay station handover based on the load notification received from the relay station handover candidate,
transmits a handover command including information indicating whether the radio terminal should perform a handover or the radio relay station should perform a handover, and
the radio relay station executes the relay station handover when the information indicates that the radio relay station should perform a handover, and the radio relay station transmits a command for the terminal handover to the radio terminal when the information indicates that the radio terminal should perform a handover.

2. The radio communication system according to claim 1, wherein the radio base station gives priority to the execution of the relay station handover over the terminal handover.

3. The radio communication system according to claim 1, wherein
the radio relay station transmits, to the radio base station, a first measurement result notification indicating a measurement result of the radio quality of a signal that the radio relay station receives,
the radio base station determines the relay station handover candidate based on the first measurement result notification received from the radio relay station, and
the radio base station transmits a load notification request requesting the transmission of the load notification to the determined relay station handover candidate.

4. The radio communication system according to claim 1, wherein
the radio base station calculates the relay station load which is a load that the radio relay station and the radio terminal exert on the radio base station when the base station load exceeds the first threshold value, based on the load of the relay station handover candidate and the relay station load, the radio base station estimates the load of the relay station handover candidate when the radio relay station executes the relay station handover, and based on the estimated load of the relay station handover candidate, the radio base station determines whether or not to execute the relay station handover.

5. The radio communication system according to claim 1, wherein the radio base station receives from a terminal handover candidate, which is a candidate of a handover destination of the radio terminal, a load notification indicating the load of the terminal handover candidate, and upon determination that a terminal handover is to be executed in case that the base station load exceeds the first threshold value, the radio base station determines the radio terminal on which to execute the terminal handover, based on the load notification received from the terminal handover candidate.

6. The radio communication system according to claim 5, wherein the radio relay station transmits, to the radio base station, a second measurement result notification indicating a measurement result of the radio quality of a signal that the radio terminal receives, the radio base station determines the terminal handover candidate based on the second measurement result notification received from the radio relay station, and the radio base station transmits a load notification request requesting the transmission of the load notification to the determined terminal handover candidate.

7. The radio communication system according to claim 5, wherein when the base station load exceeds the first threshold value, the radio relay station calculates a terminal load which is a load that the radio terminal exerts on the radio relay station, and transmits a load notification indicating the terminal load to the radio base station, based on the load of the terminal handover candidate and the load notification received from the radio relay station, the radio base station estimates the load of the terminal handover candidate when the radio terminal executes the terminal handover and the base station load when the radio terminal executes the terminal handover, and based on the estimated load of the terminal handover candidate and the estimated load of the base station load, the radio base station determines the radio terminal on which to execute the terminal handover.

8. The radio communication system according to claim 1, wherein when the relay station handover or the terminal handover is executed as a result of the base station load exceeding the first threshold value, the radio base station transmits a notification concerning the relay station handover or the terminal handover to the radio relay station or the handover destination of the radio terminal.

9. The radio communication system according to claim 1, wherein after the relay station handover or the terminal handover is executed as a result of the base station load exceeding the first threshold value, when the base station load becomes smaller than a second threshold value, the radio base station transmits a notification concerning the base station load to the radio relay station or the handover destination of the radio terminal.

10. The radio communication system according to claim 1, wherein when the relay station handover or the terminal handover is executed as a result of the base station load exceeding the first threshold value, the radio base station receives a notification concerning the load of the handover destination from the radio relay station or the handover destination of the radio terminal.

11. A radio base station to which a radio relay station that relays the communication with at least one radio terminal connects, comprising:

a receiver configured to receive from a relay station handover candidate, which is a candidate of a handover destination of the radio relay station, a load notification indicating the load of the relay station handover candidate, wherein the radio relay station transmits a battery notification indicating the battery remaining amount of the radio terminal to the radio base station, and upon determination that a terminal handover is to be executed in case the base station load exceeds the first threshold value, the radio base station determines the radio terminal on which the terminal handover is to be executed based on the battery notification received from the radio relay station;

a calculator configured to calculate a base station load which is a load of the radio base station, and to determine whether to execute the relay station handover or the terminal handover when the base station load exceeds a first threshold value, wherein the calculator determines whether or not to execute the relay station handover based on the load notification received from the relay station handover candidate; and a transmitter configured to transmit a command for either the relay station handover in which the radio relay station switches connection destinations, or the terminal handover in which the radio terminal switches the connection destinations to the radio relay station when the base station load exceeds the first threshold value.

12. A handover control method, comprising steps of: a step of connecting, by a radio relay station, to a radio base station; connecting, by at least one radio terminal, to the radio relay station;

relaying, by the radio relay station, the communication between the radio terminal and the radio base station;

receiving from a relay station handover candidate, which is a candidate of a handover destination of the radio relay station, a load notification indicating the load of the relay station handover candidate;

wherein the radio relay station transmits a battery notification indicating the battery remaining amount of the radio terminal to the radio base station, and upon determination that a terminal handover is to be executed in case the base station load exceeds the first threshold value, the radio base station determines the radio terminal on which the terminal handover is to be executed based on the battery notification received from the radio relay station;

determining, by the radio base station, whether to execute a relay station handover or a terminal handover when a base station load exceeds a first threshold value, wherein the determining comprises determining whether or not to execute the relay station handover based on the load notification received from the relay station handover candidate;

transmitting, from the radio base station to the radio relay station, a handover command including information indicating whether the radio terminal should perform a handover or the radio relay station should perform a handover when the base station load which is a load of the radio base station exceeds the first threshold value;

executing, by the radio relay station, the relay station handover when the information indicates that the radio relay station should perform a handover; and transmitting, from the radio relay station to the radio terminal, a command for the terminal handover when the information indicates that the radio terminal should perform a handover.

\* \* \* \* \*